UNITED STATES PATENT OFFICE.

HARRY S. MORK, OF BROOKLINE, AND GUSTAVUS J. ESSELEN, JR., OF SWAMPSCOTT, MASSACHUSETTS, ASSIGNORS TO CHEMICAL PRODUCTS COMPANY, OF BOSTON, MASSACHUSETTS, A CORPORATION OF MAINE.

CELLULOSIC COMPOSITIONS.

1,193,178.  Specification of Letters Patent.  Patented Aug. 1, 1916.

No Drawing.   Application filed April 29, 1916.   Serial No. 94,494.

*To all whom it may concern:*

Be it known that we, (1) HARRY S. MORK and (2) GUSTAVUS J. ESSELEN, Jr., citizens of the United States, residing at (1) Brookline and (2) Swampscott, in the counties of (1) Norfolk and (2) Essex, State of Massachusetts, have invented certain new and useful Improvements in Cellulosic Compositions, of which the following is a specification.

In the practical application of dissolved cellulose and soluble cellulose compounds, including cellulose esters, to the various arts and manufactures, such as the production of films, varnishes, filaments, plastic masses, etc., it is frequently the practice to blend or mix or otherwise add to the cellulosic solution, or to the cellulose or cellulosic compound, certain non-cellulosic materials commonly termed softeners, camphor substitutes or the like, such additions being made for the purpose of imparting to the cellulose or its compounds some desired properties, such as non-inflammability, plasticity under heat, flexibility, etc. These softeners, camphor substitutes and the like, which we shall hereafter for convenience designate as "modifiers," function in many different ways in cellulosic combinations; and the properties which they impart to the product depend upon and are determined by both the physical and the chemical properties of the particular modifier used. For example, if a modifier is non-inflammable, it will impart this property to the cellulose to a degree which is of course dependent upon the character of the modifier and the proportion added; if the modifier is relatively non-volatile its effect will be more permanent than that of a more volatile modifier; if the modifier is a solvent under suitable conditions for the cellulosic material, it will as a rule impart greater flexibility than if it is a non-solvent; and particularly, modifiers which are liquid at normal temperatures will, other things being equal, impart greater flexibility than those which are solid at normal temperatures.

For many applications of cellulosic compounds it is desired to impart thereto both permanent flexibility and non-inflammability. We have discovered that these two desirable properties can be imparted jointly and to a very marked degree by adding to cellulosic compounds a mixture of triphenyl phosphate and phenyl salicylate. These substances used in combination with each other present striking advantages as compared with the use of either component alone. Without limiting the invention by reference to any theoretical considerations, we may point out as a probable explanation of this observed fact, that whereas both triphenyl phosphate and phenyl salicylate are solids at normal temperatures, yet when the two are melted together, through a wide range of proportions, the resulting mixture or combination remains liquid at normal temperatures, and therefore imparts a high degree of flexibility to the cellulosic compound.

The proportions in which the above substances are combined may vary widely according to the particular cellulosic material to be modified, and the nature and degree of the effect desired. Also, the mixture may be used in any desired proportion to the cellulosic body, according to the result sought, as will be readily understood. As one illustrative example of the practice of the invention, we may incorporate with 100 parts of cellulose acetate fifteen parts by weight of the triphenyl phosphate-phenyl salicylate mixture, the latter prepared by combining the two phenyl compounds in about the proportions of their molecular weights. As above stated, such proportions are illustrative only, and are subject to very wide variations for particular applications.

Combinations of the above mentioned modifiers are particularly useful in conjunction with cellulose acetates, and also with cellulose nitrates, although by reason of the high inflammability of the latter esters the effect of the modifier in reducing inflammability is less marked than in the case of the acetates.

We claim:—

1. A composition of matter containing a cellulose compound, triphenyl phosphate and phenyl salicylate.

2. A composition of matter containing a cellulose ester, triphenyl phosphate and phenyl salicylate.

3. A composition of matter containing cellulose acetate, triphenyl phosphate and phenyl salicylate.

4. A composition of matter suitable for use as a modifier for cellulose compounds, and containing triphenyl phosphate and phenyl salicylate.

In testimony whereof, we affix our signatures.

HARRY S. MORK.
GUSTAVUS J. ESSELEN, Jr.